(12) United States Patent
Livny et al.

(10) Patent No.: US 8,429,602 B2
(45) Date of Patent: Apr. 23, 2013

(54) IDENTIFICATION OF USER INTERFACE CONTROLS

(75) Inventors: Yonathan Livny, Yehud (IL); Rotem Bentzur, Yehud (IT); Dor Nir, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 12/723,459

(22) Filed: Mar. 12, 2010

(65) Prior Publication Data

US 2011/0225567 A1 Sep. 15, 2011

(51) Int. Cl.
*G06F 9/44* (2006.01)
(52) U.S. Cl.
USPC ............ 717/110; 717/104; 717/120; 717/175
(58) Field of Classification Search ........................ None
See application file for complete search history.

(56) References Cited

U.S. PATENT DOCUMENTS

2007/0168919 A1* 7/2007 Henseler et al. .............. 717/101

OTHER PUBLICATIONS

A. M. Memon and Q. Xie, "Studying the fault-detection effectiveness of GUI test cases for rapidly evolving software," IEEE Transactions on Software Engineering, vol. 31, No. 10, pp. 884-896, 2005.
A. M. Memon and Q. Xie, "Using transient/persistent errors to develop automated test oracles for event-driven software," in ASE '04: Proceedings of the 19th IEEE international conference on Automated software engineering. Washington, DC, USA: IEEE Computer Society, 2004, pp. 186-195.
Hewlett-Packard Development Co., L.P., "Configuring Object Identification," HP QuickTest Professional User Guide, vol. 1, Ch. 4, software version: 10.00, released Jan. 2009, updated Mar. 9, 2009, <http://support.openview.hp.com/selfsolve/document/ KM628028?searchIdentifier=-6cf38da%3a13b93f9f14a%3a-52f58resultType=document&documentURL=KM628028 &resultsURL=%2fselfsolve%2fmanuals&allowReturn=true &searchString=&searchKey=2012-12-13+02%3a59%3a28>.
Hewlett-Packard Development Co., L.P., °Extensibility Accelerator for HP Functional Testing,' software version: 1.10, originally released Nov. 2009, updated Sep. 20, 2010, <http://support. openview.hp.com/selfsolve/document/ KM998695?searchIdentifier=-6cf38da%3a13b93f9f14a%3a-52f5 &resultType=document&documentURL=KM998695 &resultsURL=%2fselfsolve%2fmanuals&allowReturn=true &searchString=&searchKey=2012-12-13+02°%3a59%3a28>.
Q. Xie and A. M. Memon, "Using a pilot study to derive a GUIi model for automated testing," ACM Transactions on Software Engineering and Methodology, pp. 1-35, 2008.
Software Testing Stuff, "Implement Web Add-in Extensibility in QTP," Dec. 9, 2008, <http://www.softwaretestingstuff.com/2008/12/ implement-web-add-in-extensibility-in.html>.

* cited by examiner

*Primary Examiner* — Chuck Kendall

(57) ABSTRACT

A mechanism is disclosed for identifying non-standard user interface controls in a target application. The mechanism includes an accelerator, an agent, and a dialog. The agent is configured to be installed into the target application and to interface with the accelerator. The dialog is configured to select non-standard controls in the target application where each non-standard control includes a set of properties. The agent is configured to provide the properties of the selected non-standard controls to the accelerator. The accelerator is configured to determine a set of common properties for the selected non-standard controls and to automatically generate an identification rule for the determined set of common properties.

20 Claims, 3 Drawing Sheets

IDENTIFICATION OF USER INTERFACE CONTROLS

BACKGROUND

Quality assurance control has long been a vexing issue in the development of software applications and web service applications in particular. Applications are often rushed to market in order to take advantage of competitive circumstances, and end users often inevitably perform final testing to discover problems. Often these problems can be addressed in final or additional versions of the applications but commonly at the expense of lost time, lost revenue, or damaged reputation. Web service applications present particularly difficult issues for quality assurance because development often occurs under extreme time pressures for compatibility with many platforms. The task becomes more complex as web service infrastructures grow and controls become more complex and customized.

Many developers concerned with quality prefer to subject applications to rigorous testing before the applications are deployed. Improvements in many web services often do not have the luxury of time to perform alpha and beta testing with limited groups of selected users. Web services are often deployed after functional and regression testing performed with a combination of automatic and manual testing. Software testing can be used to address many of the quality issues, but can provide bottlenecks in application development if the tests are inefficient, difficult to implement, or not intuitive for even novice testers. Some developers may even forgo software testing altogether for these reasons.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
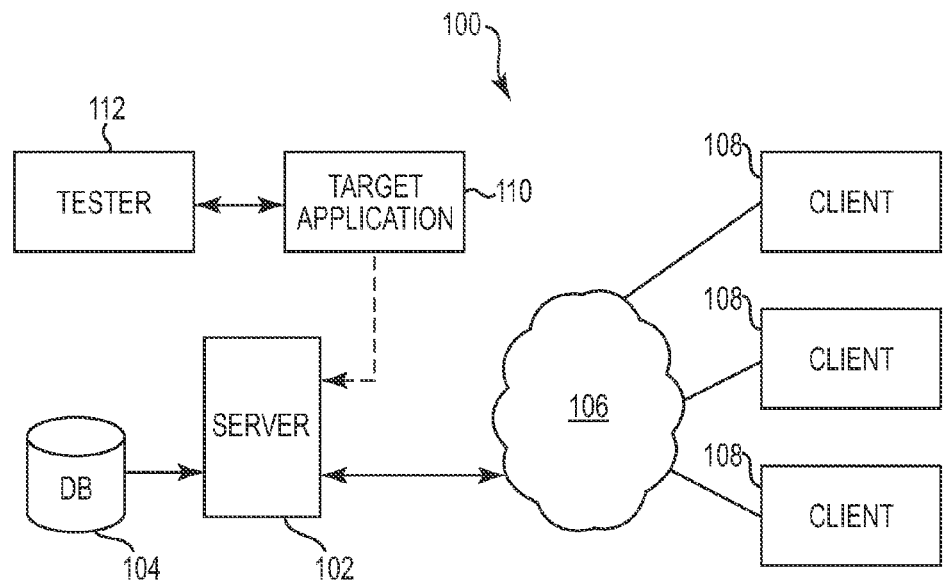
FIG. 1 is a block diagram illustrating an embodiment of an operating environment.

FIG. 1 illustrates an embodiment of an operating environment 100. The operating environment includes a server 102 typically coupled to a database 104, or other storage, and communicatively coupled to network 106, such as the Internet. The server 102 is thus accessible to a number of clients 108 that can access the server with a web browser in the case of a thin client or another application in the case of a smart client. In one example, the server 102 functions on behalf of a retailer, and the database 104 includes a set of items available for purchase, download, or both. In another example, the server 102 can function on behalf of a news organization, and the database 104 includes a number of items and content for review. Other examples are contemplated. The server 102 can operate one or more target computer applications 110, which can also be portions of computer applications, such as a user interface that can be accessed by the users 108 in the form of a page, a link, or other mechanism. Target application 110 often includes one or more programmed controls, or user interfaces, that allow the users 108 to interact with target application 110. The controls can be pre-programmed, such as from a known set of user controls, can be modified from the pre-programmed set of controls, can be combinations of pre-programmed controls, can be uniquely developed controls, or any combination of these.

Target application 110 is shown coupled to the server 102 with a dashed line. In many instances, the application can be subjected to a tester 112 prior to being deployed on the server 102 for network access. The tester 112 can be configured to perform a number of tests on target application 110, such as simulation testing, functional testing, or regression testing to determine how a new or improved application works with previous components, to determine pitfalls or quality of target application 110 before it is deployed.

The tester 112 can include one or more testing applications that can perform a number of pre-determined or uniquely-configured tests on the application. One example of a testing application is sold under the trade designation "QuickTest Professional" available from Hewlett-Packard Company of Palo Alto, Calif. "QuickTest Professional" is an automated functional Graphical User Interface (GUI) testing tool that allows the automation of user actions on a web or client based and desktop computer application. "QuickTest Professional" testing tool can be used for functional regression test automation, and the testing tool uses a scripting language to specify the test procedure and to manipulate the objects and controls of the application under test.

Figure 2:
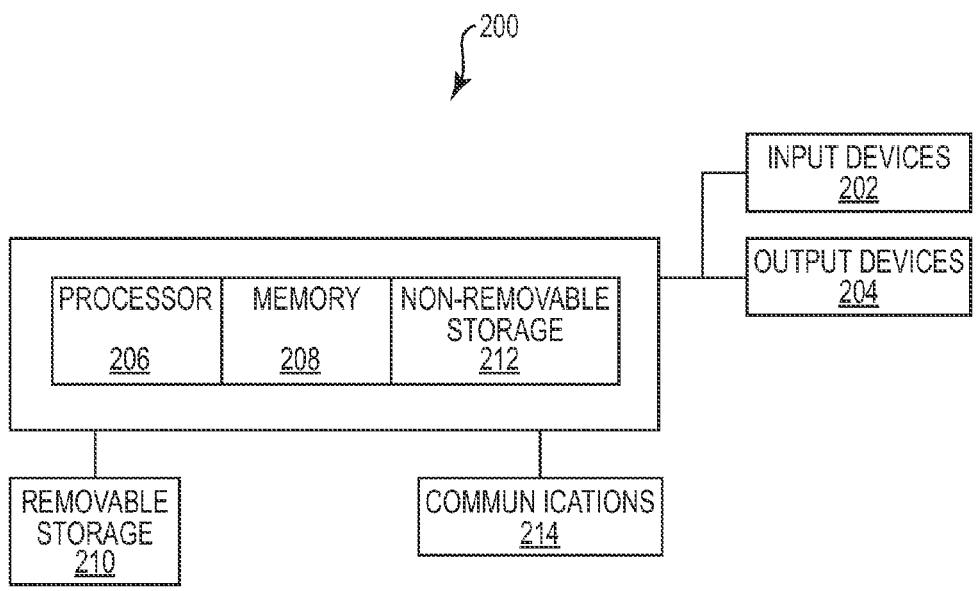
FIG. 2 is a block diagram illustrating an embodiment of a computing device suitable for use with the operating environment of FIG. 1.

FIG. 2 illustrates an embodiment of a computer system that can be employed in the operating environment 100 as the server 102, the tester 112, or both, and includes a computing device 200. In one example, the computing device 200 can include or can be coupled to one or more input devices 202, such as keyboard, pointing device (e.g., mouse), voice input device, touch input device, or the like. Computing device 200 can also include or can be coupled one or more output devices 204, such as a display, printer, or the like. In a basic configuration, computing device 200 typically includes a processor architecture having at least one processing unit, i.e., processor 206, and memory 208. Depending on the configuration and type of computing device, memory 206 may be volatile, non-volatile, or some combination of the two. The memory 208 can be arranged in a memory hierarchy such as a cache. Computing device 200 can also include additional storage including, but not limited to, magnetic or optical disks or solid state memory, or flash storage devices such as removable storage 210 and non-removable storage 212 for storage of information such as computer readable instructions, data structures, program modules or other data. The computing device 200 can be configured to run an operating system software program that can be stored on the storage media as well as one or more software applications, which make up a system platform. Memory 208, removable storage 210 and non-removable storage 212 are all examples of computer storage media that can be used to store the desired information and that can be accessed by computing device 200. Computer storage media can be part of computing device 200. Computing device 200 can also include one or more communication connections 214 that allow the computing device 200 to communicate with other computers/applications 216. These other computers/applications can be used to store desired information that can be accessed by computing device 200.

Figure 3:
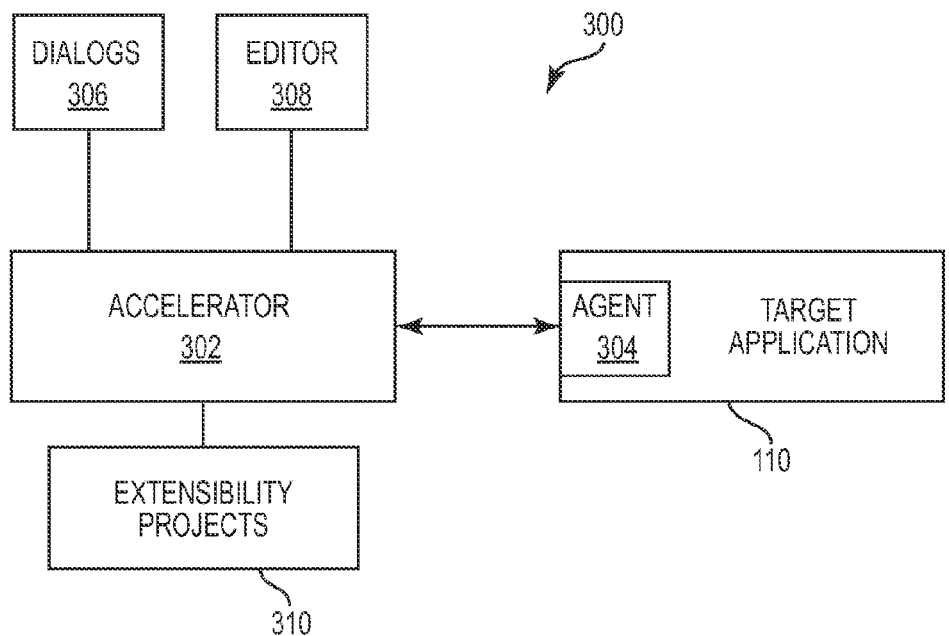
FIG. 3 is a block diagram illustrating an embodiment of a mechanism configured to interact with a target application and identify user interface controls.

FIG. 3 illustrates an embodiment of a mechanism 300 that can be configured to run on the computing device 200, such as a method or a software application, and, when used in connection with a testing tool (not shown) and the target application 110, can provide an embodiment of a testing system. In one example, the mechanism 300 can be implemented in a software testing application such as QuickTest Professional, as an integrated development environment (IDE) or part of an IDE, as a standalone multiple-document interface (MDI) application, or any other suitable computer program configured to interact with target application 110. In one embodiment, the mechanism 300 is implemented in a form sold under the trade designation Visual Studio (VS) available from Microsoft Corporation of Redmond, Wash., such as in a VS Shell.

In some examples, the mechanism 300 is or can be included as part of an automatic testing tool that allows for the creation of high-level tests of the target application 110, such as through the use of a graphical user interface (GUI). One aspect of testing applications includes testing controls or runtime objects of the target application, such as user interfaces of the target application 110. An example of a control is a program feature that is used to initiate an action, such as a link in a web page. A test developer identifies the controls with one or more rules. Testing tools often include support for the identification of many standard controls used in applications. Standard controls include predefined identification rules in the testing tool or can be recognized from a single example of a control.

In addition to standard controls, however, applications can include many controls that are not predefined or recognized, i.e., non-standard controls. Non-standard controls such as custom-created controls, or developer-created controls, have proliferated in many applications and are quite common in many applications subject to test. Non-standard controls can be difficult to identify with many testing tools and thus difficult to support. A single non-standard control can also include combinations of other custom-created controls and/or standard controls, and the like, making them even more difficult to identify. For example, three standard controls that each represents a separate link can be combined in a single non-standard control as three parts of a logical unit working together in the test application 110. In order to create support for non-standard controls, test developers manually edit or write support code or rules for the test of the application, which is a time-consuming task. Further, the task of identifying and supporting non-standard controls is often reserved for test developers with detailed knowledge of the underlying technology used in the application. Many test developers without such detailed knowledge write erroneous rules to identify the controls.

Mechanism 300 includes an accelerator 302 configured to manage an automatic generation of identification rules for non-standard controls. The mechanism further includes an agent 304 installed in the target application 110 and a dialog 306 to interface with the test developer, i.e., the user of the mechanism 300.

The accelerator 302 is configured to install agent 304 in the target application 110 and interacts with the target application 110 through agent 304. The agent 304 provides the accelerator 302 with the properties of selected controls in the target application 110. In one embodiment, the installed agent 304 provides the accelerator 302 with detailed and specific information on the properties of the control, and often includes properties of the target application related to or interfacing with the control. In order to provide this, the mechanism 300 is designed to implement the technology of the target application 110. In one embodiment, the mechanism can also be technology agnostic in that it can work with several, if not all, extensibility technologies. The accelerator 302 receives the properties and generates rules. In one embodiment, the accelerator receives the properties for two or more identical or similar controls in the target application 110, determines common properties of the selected controls or a set of common properties, and generates a rule based on the common properties. In one embodiment, the accelerator 302 stores the rules in a memory 208 as an extensible markup language (XML) file.

The accelerator 302 interfaces with the test developer through one or more dialogs 306 that enables a user to select controls in the target application 110 and expose the functionality of the selected controls to the user. In one embodiment, the dialog is in the form of a GUI and the user is able to select the controls with an input device 202 such as a keyboard, mouse, track pad, or other input device. The accelerator 302 receives the common properties of the selected controls from the agent 304. The accelerator 306 automatically generates a set of identification rules for the common properties and presents at least the identification rules to the dialog 306. In one embodiment, the XML file of the control properties is presented to the dialog. Depending on the configuration of the dialog, a set of at least some of the properties or all of the properties can be presented.

In some embodiments, the mechanism can include additional features. For example, the mechanism can include an editor 308 and project storage 310. The editor 308 provides an ability to input other identification rules as the test developer sees fit, or ability for the test developer to edit or modify the identification rules generated with the accelerator 302. In one embodiment, the editor 310 can include an error-list generator (not shown) to identifies errors resulting from editing (the errors can include functions declared but not implemented, incorrect XML structure, and the like). In one embodiment, the mechanism is implemented in a VS Shell and the editor 310 can include at least one of XML, JavaScript, or the like, editors that can support syntax coloring, intellisense, error marking, and code folding. The project storage 310 feature provides an ability to store identification rules and edited rules for later use or modification. In one embodiment, the project storage 310 can import identification rules from other sources.

Figure 4:
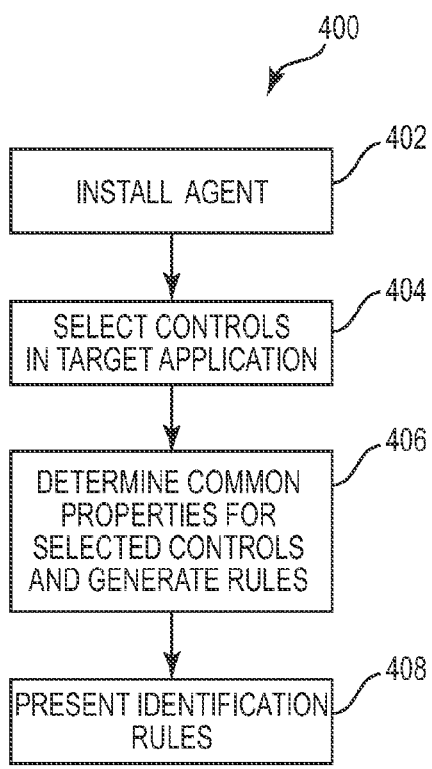
FIG. 4 is a block diagram illustrating an embodiment of a method for use with a mechanism such as illustrated in FIG. 3.

FIG. 4 illustrates an embodiment of a method 400 of generating identification rules used with a mechanism, such as mechanism 300. An agent, such as agent 304 is installed at 402 within the target application 110. Instances of identical or similar controls are selected at 404. The controls are generally non-standard controls in the target application. The agent collects information regarding the selected controls (from 404) and determines a set of common properties that are used to generate a common identification rule for the selected controls at 406. In one embodiment, the common identification rule determined at 406 is distinguished from identification rules for standard controls. An identification rule is generated at 408, which can be presented to a test developer. In one embodiment, the identification rule is presented to the test developer for review and editing and can be applied to other instances of the identical or similar controls throughout the target application 110.

In one embodiment of method 400, the mechanism presents the test developer with a GUI. The test developer can select the controls of interest with an input device 202 as part of 404. In one embodiment, the input device is a form of a pointing device that controls a cursor on the GUI. For example, a test developer can move a mouse to place the cursor over a control (such as a link) on the target application. The test developer can "click" the mouse while the cursor is over the control to select it. This can be repeated with other identical or similar controls, such as controls providing identical or similar functions. In one embodiment, the test developer can define the controls, e.g., if three standard controls are combined to form a single non-standard control the test developer can define the combination as the non-standard control, and the mechanism will examine the control as a single logical unit.

After controls are selected, the method can progress to determine a common identification rule at 406. In one embodiment, the test developer can exit from the selection aspect 404 or otherwise indicate to the mechanism that the selection is complete. Information, such as properties and runtime attributes that define the control, regarding each of the selected controls is collected, such as by an agent installed in the target application 110. The information collected is generally detailed and application technology specific. In addition, the information can include "surrounding information," such as information on how the control interfaces with other parts of the target application 110. The information of the selected controls is compared to each other to determine common properties.

The determined common properties are used to generate an identification rule for the selected controls at 408. In one embodiment, the common properties and the identification rule generation can be determined automatically with the mechanism and without additional input from the test developer. The identification rules can be applied to the selected controls as well as to other similar or identical controls in the target application. In this embodiment, the identification rule is generated without consideration given to the test developer's knowledge of the underlying technology. Even if the test developer is well familiar with the technology, automatic generation of the identification rule serves to save time in test development by eliminating or significantly reducing the manual task of writing identification rules. In one embodiment, the identification rule can be presented to the test developer in a GUI or editor, and the test developer can manually edit the identification rule, store the rule, export the rule, and the like.

Figure 5:
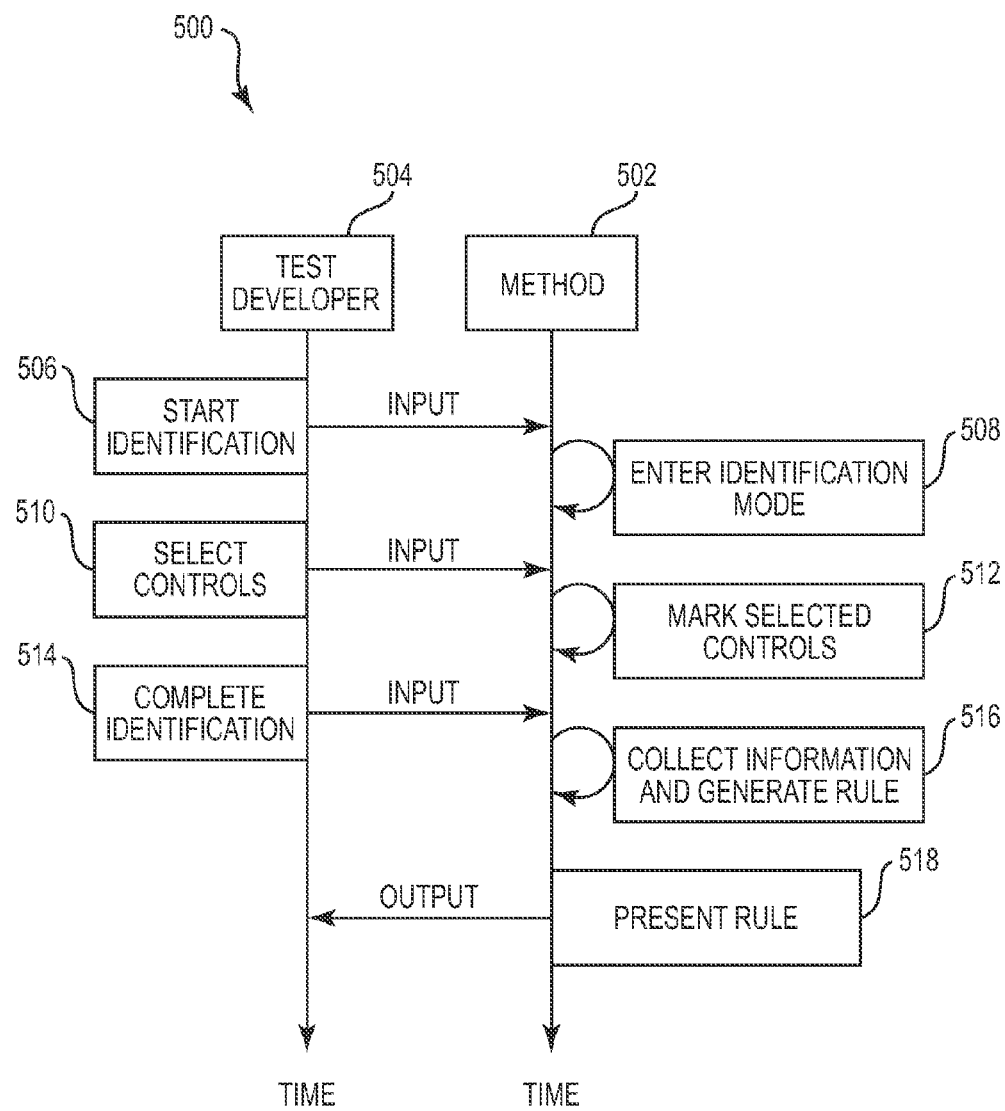
FIG. 5 is a timeline illustrating an embodiment of a user interaction with a method such as illustrated in FIG. 4.

FIG. 5 illustrates a timeline 500 of an embodiment of the mechanism and method 502 described above interfacing with a test developer 504. The developer initiates a process, such as by selecting a button to start identification at 506. In one embodiment, the test developer selects a "Start Identification" prompt or button on a GUI for an application running a process 400. In response, the method enters an identification mode at 508. The GUI provides a rendering of the target application that hosts non-standard controls. The test developer moves a pointing device to highlight controls under a cursor. In one embodiment, the highlight can identify whether the control is standard or non-standard, or the function of the control, or the like. The test developer can select non-standard controls with the pointing device at 510. The process marks each selected control as a custom control candidate for further processing at 512. In one embodiment, the test developer can also remove selected non-standard controls from the custom control candidates if desired or if one or more were erroneously selected. After two or more non-standard controls are selected, the test developer can indicate that identification is completed at 514, such as by selecting an "Identification Complete" button on the GUI. The method collects detailed information on the identified custom control candidates as well as related information while running in the background at 516. In one embodiment, once the information is collected, it is processed in the background and an identification rule is generated. The method returns to foreground and presents the identification rule to the test developer for review and editing at 518. When the test developer is satisfied with the rule, the test developer can embed the identification rule in an extensibility support for the non-standard control in a test application.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A mechanism configured to interact with a target application, the mechanism comprising:
   an accelerator;
   an agent configured to be installed into the target application and to interface with the accelerator; and
   a dialog configured to select non-standard controls in the target application wherein each non-standard control includes a set of properties;
   wherein the agent is configured to provide the properties of the selected non-standard controls to the accelerator;
   wherein the accelerator is configured to determine a set of common properties for the selected non-standard controls; and
   wherein the accelerator is configured to automatically generate an identification rule for the determined set of common properties.

2. The mechanism of claim 1 wherein the target application includes non-standard controls and standard controls.

3. The mechanism of claim 2 wherein at least one of the non-standard controls includes at least one standard control.

4. The mechanism of claim 2 wherein the set of common properties are distinguished from properties of standard controls.

5. The mechanism of claim 1 wherein the agent is configured to provide to the accelerator information regarding the interface of the target application with the non-standard controls.

6. The mechanism of claim 1 wherein the accelerator receives from the agent properties of two or more identical or similar controls of the selected controls.

7. The mechanism of claim 1 wherein the identification rule is stored in a memory.

8. The mechanism of claim 1 wherein the dialog includes a graphical user interface to present the generated identification rule.

9. The mechanism of claim 1 comprising:
an editor configured to receive modifications to the identification rules and to present an error list, and a project storage to store modified identification rules.

10. A computer readable storage medium storing computer executable instructions for controlling a computing device to perform a method comprising:
installing an agent into a target application on the computing device;
selecting instances of similar or identical non-standard controls in the target application;
collecting with the agent information regarding the selected non-standard controls wherein the information includes properties of the selected non-standard controls;
automatically determining a set of common properties from the properties of the selected non-standard controls with a computing device; and
automatically generating an identification rule for the similar or identical non-standard controls from the set of common properties with the computing device.

11. The computer readable storage medium of claim 10 wherein generating the identification rule includes distinguishing the identification rule for the similar identical non-standard controls from identification rules for standard controls.

12. The computer readable storage medium of claim 10, the method further comprising presenting the identification rule in a graphical user interface on the computer system.

13. The computer readable storage medium of claim 10 wherein the selecting instances of similar or identical non-standard controls is performed via a dialog to receive inputs to select the instances.

14. The computer readable storage medium of claim 13 wherein the determining the set of common properties occurs after the dialog receives an input indicating that the selecting is complete.

15. The computer readable storage medium of claim 13 wherein a graphical user interface is used with the target application for selecting instances of similar or identical controls.

16. The computer readable storage medium of claim 10 wherein the identification rule is applied to all instances of similar or identical non-standard controls of the selected non-standard controls in functional testing of the target application.

17. A method, comprising:
initiating a process with a computing device to begin identification in a target application;
presenting a rendering of the target application in the computer device;
selecting instances of similar or identical non-standard controls in the rendering of the target application;
collecting information regarding properties of the of the selected non-standard controls; and
automatically generating an identification rule for the selected similar or identical non-standard controls based on a common set of properties.

18. The method of claim 17 and further comprising presenting the identification rule on a display.

19. The method of claim 17 wherein the selecting instances includes selecting the instances on the rendering of the target application with an input device interfacing with the computing device.

20. The method of claim 17 wherein the selecting instances includes selecting more than two instances of the similar or identical non-standard controls.

* * * * *

UNITED STATES PATENT AND TRADEMARK OFFICE
CERTIFICATE OF CORRECTION

| | |
|---|---|
| PATENT NO. | : 8,429,602 B2 |
| APPLICATION NO. | : 12/723459 |
| DATED | : April 23, 2013 |
| INVENTOR(S) | : Yonathan Livny et al. |

It is certified that error appears in the above-identified patent and that said Letters Patent is hereby corrected as shown below:

In the Claims

In column 8, line 24, in Claim 17, after "properties" delete "of the of the" and insert -- of the --, therefor.

Signed and Sealed this
Twenty-ninth Day of September, 2015

Michelle K. Lee
*Director of the United States Patent and Trademark Office*